Patented Oct. 27, 1931

1,828,737

UNITED STATES PATENT OFFICE

WINFRID HENTRICH, OF WIESDORF-ON-THE-RHINE, RUDOLF KNOCHE, OF LEVERKUSEN-ON-THE-RHINE, AND ERNST TIETZE, OF COLOGNE-ON-THE-RHINE, GERMANY, ASSIGNORS TO GENERAL ANILINE WORKS, INC., OF NEW YORK, N. Y., A CORPORATION OF DELAWARE

MONOAZODYESTUFFS

No Drawing. Application filed November 23, 1928, Serial No. 321,512, and in Germany November 29, 1927.

Our present invention relates to new monoazo dyestuffs capable of being chromed, more particularly it relates to dyestuffs of the following probable general formula:

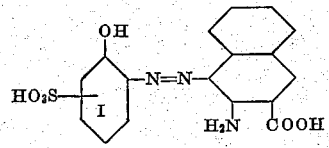

wherein the nucleus marked I may be substituted by halogen.

The new dyestuffs are obtainable by diazotizing an ortho-aminophenol sulfonic acid of the formula

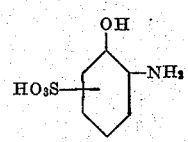

or a halogen substitution product thereof and combining the diazo compound in an acid medium with 2-naphthylamine-3-carboxylic acid. They are in form of their alkali metal salts dark reddish brown powders, easily soluble in water with a red coloration. When treated with stannous chloride and hydrochloric acid they are split up to the corresponding o-amino-phenol-sulfonic acid and 1.2-naphthylenediamine-3-carboxylic acid. They dye wool red shades, which change to a green shade of a purity hitherto unobtainable in this class of dyestuffs by after-chroming the original dyeings according to usual methods. The dyeings are very fast to light, sulfur, fulling, steaming and carbonization.

The following example illustrates our invention, without limiting it thereto:

*Example.*—187 parts by weight of 2-naphthylamine-3-carboxylic acid are dissolved in water with the aid of alkali and the diazo solution, obtained by diazotizing 223 parts by weight of 4-chloro-2-amino-1-phenol-6-sulfonic acid in diluted hydrochloric acid, is added thereto while vigorously stirring. Pyridine is then added until the solution is only faintly acid to Congo red. When the coupling is complete, the dyestuff is converted by means of ammonia into the ammonium salt, which is salted out, pressed and dried. The product thus obtainable, which probably corresponds in its free form to the formula:

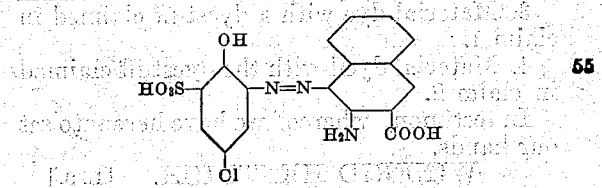

forms a reddish brown powder, easily soluble in water in form of its sodium salt with a red coloration, it dyes wool a red shade from an acid bath and, when chromed on the fiber, yields a very clear yellowish green shade, which withstands very satisfactorily normal and strong fulling and possesses satisfactory fastness to sulfur, steaming and carbonization and excellent fastness to light.

When treated with stannous chloride and hydrochloric acid the dyestuff is split up to 2-amino-4-chloro-1-hydroxybenzene-6-sulfonic acid and 1.2-naphthylene-diamine-3-carboxylic acid.

Dyestuffs of similar properties can be obtained by replacing the 4-chloro-2-aminophenol-6-sulfonic acid by, for example, the 5-sulfonic acid or by 2-amino-phenol-4-sulfonic acid.

We claim:

1. As new compounds, o-hydroxy-monoazo dyestuffs capable of being chromed, having in their free form the probable general formula:

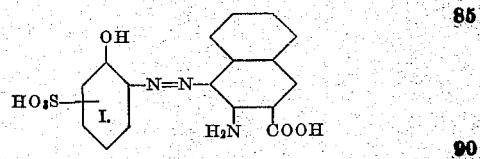

wherein the nucleus marked I. may be substituted by halogen, said dyestuffs being in form of their alkali metal salts reddish brown powders, easily soluble in water with red colorations, dyeing wool from an acid bath red shades, which change to green by afterchroming, yielding when treated with stannous chloride and hydrochloric acid an o-amino-phenol-sulfonic acid and 1.2-naphthylenediamine-3-carboxylic acid.

2. As a new compound, the o-hydroxy-mono-azo dyestuff capable of being chromed, having in its free form the probable formula:

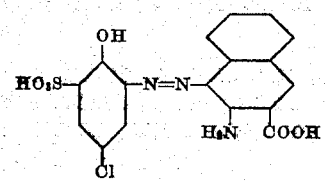

said dyestuff being in form of its sodium salt a reddish brown powder, easily soluble in water with a red coloration, dyeing wool from an acid bath a red shade, which changes to a clear green of good fastness properties by after-chroming.

3. Material dye with a dyestuff claimed in claim 1.

4. Material dyed with the dyestuff claimed in claim 2.

In testimony whereof we have hereunto set our hands.

WINFRID HENTRICH. [L. S.]
RUDOLF KNOCHE. [L. S.]
ERNST TIETZE. [L. S.]